US007130872B2

(12) United States Patent
de Bonet

(10) Patent No.: US 7,130,872 B2
(45) Date of Patent: Oct. 31, 2006

(54) MULTI-TIERED CACHING MECHANISM FOR THE STORAGE AND RETRIEVAL OF CONTENT MULTIPLE VERSIONS

(75) Inventor: Jeremy S. de Bonet, N. Andover, MA (US)

(73) Assignee: MobiTV, Inc., Emeryville, CA (US)

( * ) Notice: Subject to any disclaimer, the term of this patent is extended or adjusted under 35 U.S.C. 154(b) by 451 days.

(21) Appl. No.: 10/345,886

(22) Filed: Jan. 16, 2003

(65) Prior Publication Data
US 2003/0167257 A1 Sep. 4, 2003

Related U.S. Application Data

(60) Provisional application No. 60/349,553, filed on Jan. 18, 2002, provisional application No. 60/349,344, filed on Jan. 18, 2002, provisional application No. 60/349,424, filed on Jan. 18, 2002.

(51) Int. Cl.
G06F 12/00 (2006.01)
G06F 7/00 (2006.01)

(52) U.S. Cl. .................. 707/203; 707/10; 707/101; 711/118

(58) Field of Classification Search .......... 707/1–10, 707/100–102, 104.1, 200–205; 711/118–119; 709/203, 217–219
See application file for complete search history.

(56) References Cited

U.S. PATENT DOCUMENTS

| 5,497,434 | A | | 3/1996 | Wilson | |
|---|---|---|---|---|---|
| 5,825,917 | A | | 10/1998 | Suzuki | |
| 5,860,100 | A | * | 1/1999 | Feiste et al. | 711/135 |
| 5,893,155 | A | * | 4/1999 | Cheriton | 711/144 |
| 5,991,773 | A | | 11/1999 | Tagawa | |
| 6,005,979 | A | | 12/1999 | Chang et al. | |
| 6,009,192 | A | | 12/1999 | Klassen et al. | |
| 6,085,198 | A | * | 7/2000 | Skinner et al. | 707/103 R |
| 6,289,358 | B1 | * | 9/2001 | Mattis et al. | 707/203 |
| 6,397,217 | B1 | * | 5/2002 | Melbin | 707/10 |
| 6,502,108 | B1 | * | 12/2002 | Day et al. | 707/203 |
| 6,591,337 | B1 | * | 7/2003 | DeKoning et al. | 711/114 |
| 6,675,214 | B1 | * | 1/2004 | Stewart et al. | 709/226 |
| 6,675,261 | B1 | * | 1/2004 | Shandony | 711/121 |
| 6,708,196 | B1 | * | 3/2004 | Atkinson et al. | 718/102 |

(Continued)

FOREIGN PATENT DOCUMENTS

EP          1 146 442 A2    10/2001

(Continued)

OTHER PUBLICATIONS

International Search Report for PCT/US02/28994, Dec. 4, 2002.

(Continued)

Primary Examiner—John R. Cottingham
Assistant Examiner—Miranda Le
(74) Attorney, Agent, or Firm—Sprinkle IP Law Group

(57) ABSTRACT

Systems and methods for improved performance in the storing and retrieving of objects. In one embodiment, the invention comprises a multi-tiered caching system implemented in a network transformation proxy. The proxy performs transformations on Web content received from a Web server and stores the transformed content in the caching system. The lowest tier of caches stores the content as cache objects, while higher tiers store references to lower tiers (such as the tier which stores the objects) as their cache objects. Cache entries are looked up using a plurality of keys. Each of the keys is used to look up an entry in a different tier of the cache.

27 Claims, 4 Drawing Sheets

U.S. PATENT DOCUMENTS

| | | | |
|---|---|---|---|
| 6,732,237 B1 * | 5/2004 | Jacobs et al. | 711/119 |
| 6,757,708 B1 * | 6/2004 | Craig et al. | 709/203 |
| 6,779,030 B1 * | 8/2004 | Dugan et al. | 709/223 |
| 2002/0073110 A1 * | 6/2002 | Duvillier et al. | 707/206 |
| 2002/0143899 A1 | 10/2002 | Di Perna | |
| 2005/0080768 A1 * | 4/2005 | Zhang et al. | 707/3 |

FOREIGN PATENT DOCUMENTS

| | | |
|---|---|---|
| EP | 1 160 692 A2 | 12/2001 |
| WO | WO 02/08940 A2 | 1/2002 |

OTHER PUBLICATIONS

Robert W. Floyd & Louis Steinberg, "*An adaptive algorithm for spatial gray scale*" SID 75 Digest: 36-37, 1975.

Paul Heckbert, "*Color image quantization for frame buffer display*" Computer Graphics, 16(3):297-307, Jul. 1982.

C. E. Shannon, "*A mathematical theory of communication*" The Bell System Technical Journal, 27(3): 379-423, Jul. 1948.

C. E. Shannon, "*A mathematical theory of communication, Part III.*" The Bell System Technical Journal, pp. 623-656, Jul. 1948.

T. A. Welch, "*A technique for high-performance data compression*" Computer, 17(6): 8-19, Jun. 1984.

Jacob Ziv, "*Coding theorems for individual sequences*" IEEE Transactions on Information Theory, 24(4): 405-412, Jul. 1978.

Jacob Ziv & Abraham Lempel, "*A universal algorithm for sequential data compression*" IEEE Transactions on Information Theory, 24(3): 337-343, May 1977.

Jacob Ziv & Abraham Lempel, "*Compression of individual sequences via variable-rate coding*" IEEE Transactions on Information Theory, 24(5): 530-536, Sep. 1978.

\* cited by examiner

MULTI-TIERED CACHING MECHANISM FOR THE STORAGE AND RETRIEVAL OF CONTENT MULTIPLE VERSIONS

CROSS-REFERENCE TO RELATED APPLICATIONS

This application claims priority to U.S. Provisional Patent Application No. 60/349,553, entitled "A Multi-Tiered Caching Mechanism for the Storage and Retrieval of Content Multiple Versions," by Jeremy S. de Bonet, filed Jan. 18, 2002, U.S. Provisional Patent Application No. 60/349,344, entitled "Modular Plug-In Transaction Processing Architecture" by de Bonet et al., filed Jan. 18, 2002 and U.S. Provisional Patent Application No. 60/349,424, entitled "Network Proxy Plafform that Simultaneously Supports Data Transformation, Storage, and Manipulation for Multiple Protocols" by de Bonet et al., filed on Jan. 18, 2002, which are hereby fully incorporated by reference herein. Additionally, U.S. patent application Ser. No. 10/342,113, entitled "Method and System of Performing Transactions Using Shared Resources and Different Applications," by de Bonet et al., filed Jan. 14, 2003 is incorporated by reference herein.

BACKGROUND OF INVENTION

1. Technical Field

This invention generally relates to storage and retrieval of electronic entities. More particularly, the invention relates to the use of multi-tiered caches for storing and retrieving objects, wherein groups of objects may be associated with each other, such as in the storage of multiple versions of Web content on a network transformation proxy.

2. Related Art

There are numerous methods for storing data. One such way is through the use of an associative array. In an associative array, an object that is to be stored is associated with a key. The object is stored in a particular location and the location is identified by the associated key. When it is desired to retrieve the object, it is only necessary to look up the key, which identifies the location of the object.

There are various implementations of associative arrays. For example, databases, file systems and caches are associative arrays. Caches, in particular, are of interest here.

Caches are associative arrays that provide local storage of data. "Local," as used here, is somewhat relative. In the case of caches that are coupled to microprocessors to allow them to operate more quickly and efficiently, "local" may mean that the cache comprises memory manufactured on the same chips as the microprocessors. In the case of caches that are used in Web proxys, however, "local" may mean that the cache is implemented in a disk drive within the proxy housing.

Caching proxys store and retrieve Web content such as Web pages using the URLs associated with the Web pages as the respective keys. One of the problems that may arise in this situation, however, is that there may be a number of different Web pages that have the same URL. For example, the substance of the Web pages may be approximately the same, but they may each be adapted for viewing on a different type of device (e.g., a desktop computer or a Web-enabled cellular phone). The key may therefore need to include additional information in order to uniquely identify the Web page that has to be retrieved. The key may therefore incorporate other characteristics of the Web page, such as cookies or the type of browser for which the page is designed.

The caching implemented in prior art proxys is typically flat. In other words, there is a single cache with multiple entries. Each cache entry contains a Web page associated with a corresponding key. As noted above, the key may incorporate both the URL and other characteristics that are necessary to uniquely identify the cached content. Thus, if the proxy needs to store 1000 Web pages having different URLs, 1000 cache entries would be required. If the proxy were required to store 10 different versions of each of these Web pages, 10,000 cache entries would be required.

Because the cache is flat, the time and/or the memory required to store and retrieve entries in the cache increases with the number of entries. Depending on the data structure used, lookup time can vary from $O(n)$ to $O(\log(n))$. even to $O(1)$ (constant time). No benefit is derived from the similarity of the entries (i.e., the fact that ten of the entries may simply be different versions of the same Web page).

Further, when a flat caching structure is used to store multiple versions of content, there is no way to handle sets of associated content. For instance, there is no way to store data that is common to all the associated content (e.g., storing HTTP headers or other information that is common to multiple versions of the same web page). The common information simply has to be stored for each of the separate versions. Similarly, there is no way to handle these sets of associated content as a group. For example, if it is desired to update every version of an obsolete Web page, there is no way to take a single action that affects all of the versions—they have to be individually located in the cache structure and updated.

It should be noted that, while multi-tiered storage mechanisms exist for databases, these are distinct from cache structures. Databases are not designed to be used as functional libraries inside of other programs. In databases systems, trees and multi-level storage and retrieval structures must be explicitly constructed by database programmers and, because of the effort, expense and overhead of implementing a database system, this technology is not applicable to high performance cache retrieval.

SUMMARY OF THE INVENTION

One or more of the problems outlined above may be solved by the various embodiments of the invention. Broadly speaking, the invention comprises systems and methods for improved performance in the storing and retrieving of objects. In one embodiment, the invention comprises a multi-tiered caching system in which cache entries can be looked up using a plurality of keys. The lowest tier of caches stores the objects, while higher tiers store references to lower tiers (such as the tier which stores the objects). Each of the keys is used to look up an entry in a different tier of the cache.

An exemplary embodiment is implemented in a network proxy. The network transformation proxy is configured to handle communications between a Web server and one or more clients (e.g., Web browsers). Consequently, the network transformation proxy may operate more efficiently if it is configured to cache web pages that are served to the clients. In this embodiment, the network transformation proxy is configured to store multiple versions of each web page, wherein each version corresponds to, for example, a different client device, each having its own display characteristics and capabilities. Rather than storing all of the different versions of the web pages in a flat cache, the web pages are stored in a multi-tiered cache. More specifically, the web pages are stored in a two-tier cache in which the URLs of the web pages serve as keys for entries in the first tier of the cache, and the versions of the web pages serve as keys for entries in the second tier of the cache (which actually contains a plurality of caches). When a client requests a web page, the URL of the desired page and the device type of the client can be identified from the request. The network transformation proxy uses the URL as a key to index into a first-tier cache. The entry corresponding to this key (the URL) contains an object which identifies a second tier cache. The network transformation proxy uses the second key (the device type) to index into the identified second-tier cache. The entry of the identified second-tier cache which corresponds to the second key contains an object which is the desired web page. This web page can then be retrieved and served to client.

An alternative embodiment comprises a method for storing and retrieving objects in a multi-tiered cache. Each object to be stored has a plurality of keys associated with it. Each key is used to index into a cache in a different tier. Every cache in all the tiers, except for those in the last tier, content objects which refer to caches in the subsequent tier. The caches in the last tier store the objects themselves, instead of references to other caches. Alternatively, the caches in the last tier may contain references to the stored objects rather than the objects themselves. Thus, storing an object in the multi-tier cache comprises storing an entry in a first-tier cache containing a first key and a reference to a second-tier cache, possibly repeating this for additional tiers (e.g., storing an entry in a second-tier cache comprising a second key and a reference to a third-tier cache), and storing the object in a lowest-tier cache with a last one of the keys. Retrieving the object comprises indexing into a first-tier cache using a first key to get a reference to a second-tier cache, and repeating this step for lower tiers, until the last tier is reached, at which point a last of the keys is used to index into the last-tier cache to retrieve the object.

Another embodiment of the invention comprises a software application. The software application is embodied in a computer-readable medium such as a floppy disk, CD-ROM, DVD-ROM, RAM, ROM, database schemas and the like. The computer readable medium contains instructions which are configured to cause a computer to execute a method which is generally as described above. It should be noted that the computer readable medium may comprise a RAM or other memory which forms part of a computer system. The computer system would thereby be enabled to perform a method in accordance with the present disclosure and is believed to be within the scope of the appended claims.

Numerous additional embodiments are also possible.

BRIEF DESCRIPTION OF THE DRAWINGS

Other objects and advantages of the invention may become apparent upon reading the following detailed description and upon reference to the accompanying drawings.

Figure 1:
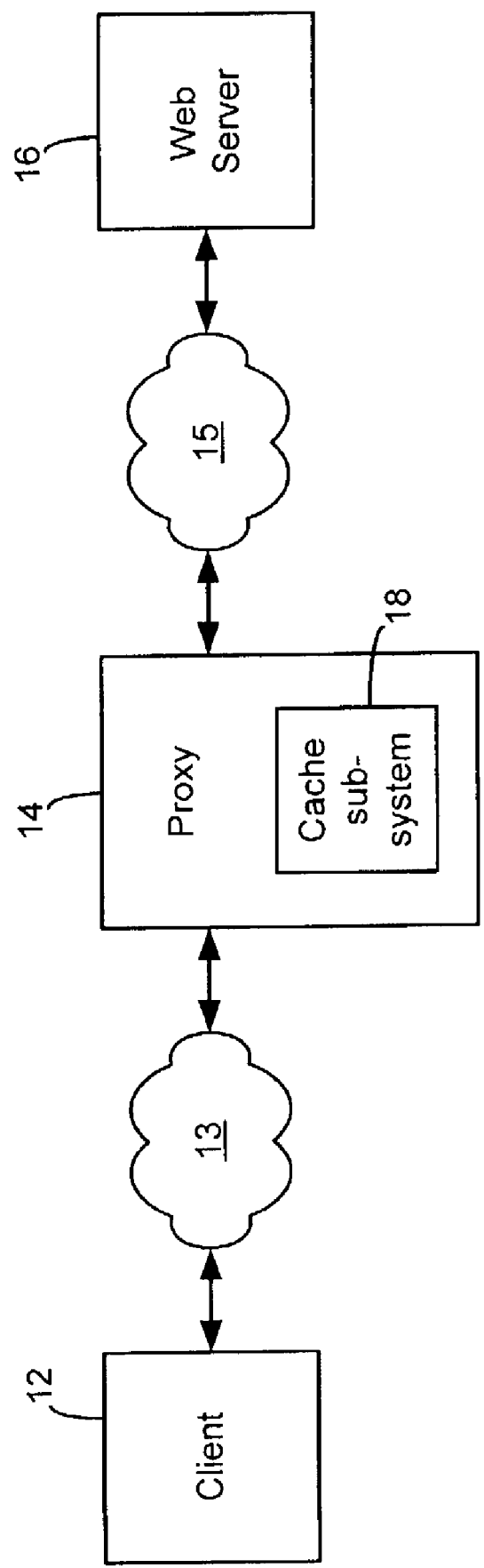
FIG. 1, a diagram illustrating an exemplary architecture of a network-based system in accordance with one embodiment of the invention.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION OF A PREFERRED EMBODIMENT

A preferred embodiment of the invention is described below. It should be noted that this and any other embodiments described below are exemplary and are intended to be illustrative of the invention rather than limiting.

Broadly speaking, the invention comprises systems and methods for improved performance in the storing and retrieving of objects. In one embodiment, the invention comprises a multi-tiered caching system in which cache entries can be looked up using a plurality of keys. The lowest tier of caches stores the objects, while higher tiers store references to lower tiers (such as the tier which stores the objects). Each of the keys is used to look up an entry in a different tier of the cache.

An exemplary embodiment is implemented in a network transformation proxy. The transformation proxy is configured to intercept and manipulate communications between a Web server and one or more clients (e.g., Web browsers). Consequently, the network transformation proxy may operate more efficiently if it is configured to cache web pages that are served to the clients. In this embodiment, the network transformation proxy is configured to generate multiple versions of every web page, wherein each version corresponds to, for example, different optimizations for each type of client device, each having its own display characteristics and capabilities. Rather than storing all of the different versions of the web pages in a flat cache, the web page versions are stored in a multi-tiered cache. More specifically, the web pages are stored in a two-tier cache in which the URLs of the web pages serve as keys for entries in the first tier of the cache, and the devices for which the pages have been transformed serve as keys for entries in the second tier of caches.

When a client requests a web page, the URL of the desired page and the device type of the client can be identified from the request. The network transformation proxy uses the URL as a key to index into a first-tier cache. The entry corresponding to this key (the URL) contains an object which is an identifier of a cache in the second tier. The network transformation proxy uses the second key (the device type) to index into the identified cache in the second tier. The entry of the identified second-tier cache which corresponds to the second key contains an object which is the desired web page. This web page can then be retrieved and served to client.

While the preferred embodiment is implemented in a network transformation proxy, it should be noted that the invention can be generalized to multi-tier caches in any of a variety of systems. Thus, even though the present disclosure focuses primarily on the implementation of the invention in a network transformation proxy, this is intended to be exemplary, rather than limiting.

The preferred embodiment of the invention operates in the context of a network environment. The network and its components are employed to distribute Web content (e.g., web pages) from one or more servers to one or more clients. Referring to FIG. 1, a diagram illustrating an exemplary architecture is shown.

As depicted in FIG. 1, the architecture comprises a client 12 which is coupled to a network transformation proxy 14, which is in turn coupled to a Web server 16. Network transformation proxy 14 includes a cache subsystem 18. Client 12 is coupled to proxy 14 via a first network 13. Proxy 14 is coupled to Web server 16 by a second network 15. It is contemplated that at least one of networks 13 and 15 comprises the Internet. The other of these networks may comprise a network which is either internal or external to a particular enterprise. It should be noted, however, that the coupling of client 12, proxy 14 and Web server 16 need not be configured in any particular manner for the purposes of the invention.

A proxy handles communication between a client device or program, such as a Web browser, and a server device or program, such as a Web server. In a Web-based system, the proxy handles the clients' requests for Web content, as well as the Web content provided by the Web server in response to these requests. In handling these communications, the proxy is responsible for emulating the Web server and thereby reducing the loading on the system (both on the Web server and on the network itself). The proxy does this by storing some of the content provided by the Web server and, when possible, providing this stored content to clients in response to requests for the content. In this manner, the proxy relieves the Web server of the burden of serving a portion of the clients' requests.

In a preferred embodiment, the network transformation proxy is configured to perform transformations of Web content provided by a server. The transformations may depend upon the client making the request for the content and the manner in which the request is made. The transformations may comprise modifications of the contents to optimize it for use on a particular type of client device. For example, Web pages may be adapted to the capabilities of different display devices (e.g., color reduction or black-and-white conversion may be performed on images in the web pages). Thus, the proxy may generate multiple versions of a particular web page (or other Web content). The proxy may also perform transformations that make more substantive modifications to the content, such as inserting different advertisements for different clients. The proxy then needs to store these different versions of the Web content.

To create and identify different versions of a Web page, the network transformation proxy uses information both on the types of transformation performed on the page and on the version provided by the source server. A version cache key also may indicate the parameter values used in a transformation. For example, if the network transformation proxy performs color reduction on an image, the key could include the number of colors to which the image is reduced. The proxy in accordance with the present disclosure provides a fast and efficient mechanism for storing and retrieving the Web content, even though the multiple versions of the content increase the total amount of information that has to be stored.

Figure 2:
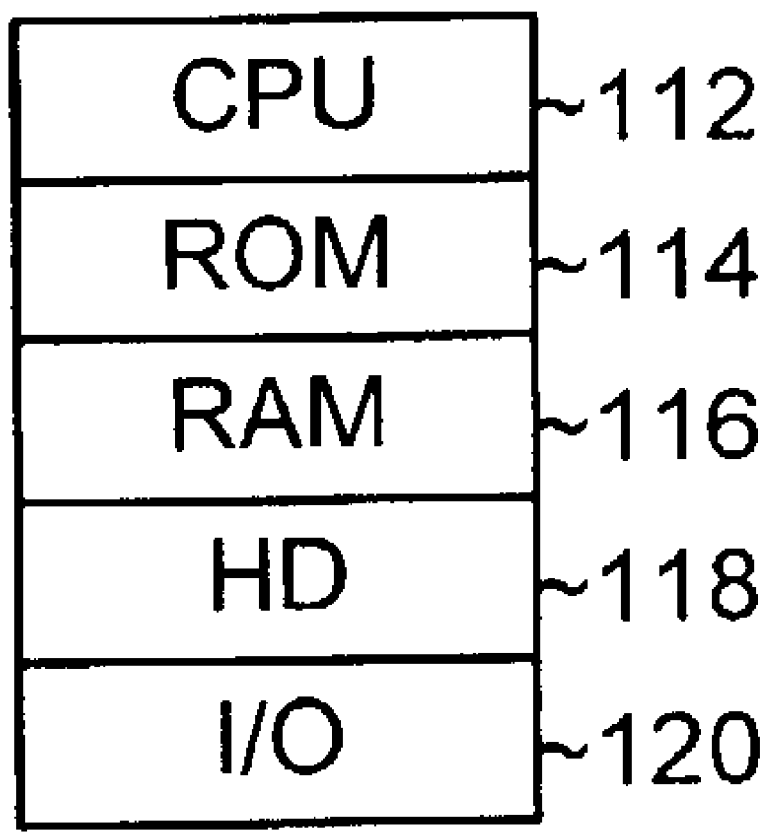
FIG. 2 is a diagram illustrating the basic configuration of a computer suitable for use as a network transformation proxy in accordance with one embodiment of the invention.

Referring to FIG. 2, a diagram illustrating the basic configuration of a computer suitable for use as a network transformation proxy in accordance with one embodiment of the invention be shown. Server 14 is implemented in a computer system 100. Computer system 100 includes a central processing unit (CPU) 112, read-only memory (ROM) 114, random access memory (RAM) 116, hard disk drive (HD) 118 and input output device (I/O) 120. Computer system 100 may have more than one CPU, ROM, random, hard disk drive, input-output device or other hardware components. Computer system 100 is nevertheless depicted as having only one of each type of component. It should be noted that the system illustrated in FIG. 2 is a simplification of an exemplary hardware configuration, and many other alternative configurations are possible.

Portions of the methods described herein may be implemented in suitable software applications that may reside within memories such as ROM 114, RAM 116 or hard disk drive 118. The software applications may comprise program instructions that are configured to cause the data processor in which they execute to perform the methods described herein. These instructions may be embodied in (stored on) internal storage devices such as ROM 114, RAM 116 or hard disk drive 118, other, and external storage devices, or storage media readable by a data processor such as computer system 100, or even CPU 112. Such media may include, for example, floppy disks, CD-ROMs, DVD ROMs, magnetic tape, optical storage media, and the like.

In an illustrative embodiment of the invention, the computer-executable instructions may be lines of compiled $C^{++}$, Java, or other language code. Other architectures may be used. For example, the functions of any one of the computers may be performed by a different computer shown in FIG. 2. Additionally, a computer program or its software components with such code may be embodied in more than one data processing system readable medium in more than one computer.

In the hardware configuration above, the various software components may reside on a single computer or on any combination of separate computers. In alternative embodiments, some or all of the software components may reside on the same computer. For example, one or more the software component(s) of the proxy computer 100 could reside on a client computer or server computer, or both. In still another embodiment, the proxy computer itself may not be required if the functions performed by the proxy computer are merged into a client computer or server computer. In such an embodiment, the client computer and server computer may be directionally coupled to the same network.

Communications between any of the client, server and proxy computers can be accomplished using electronic, optical, radio-frequency, or other signals. For example, when a user is at a client computer, the client computer may convert the signals to a human understandable form when sending a communication to the user and may convert input from a human to appropriate electronic, optical, radio-frequency, or other signals to be used by, the proxy or server computers. Similarly, when an operator is at the server computer, the server computer may convert the signals to a human understandable form when sending a communication to the operator and may convert input from a human to appropriate electronic, optical, radio-frequency, or other signals to be used by the computers.

As explained above, the proxy is responsible for storing information previously provided by the Web server so that this information can be provided to clients in response to their requests. This information is stored in the cache subsystem of the proxy. The cache subsystem actually comprises a plurality of caches that are organized in two or more tiers. The upper and intermediate tiers reference caches in lower tiers. The lowest level tier actually stores the desired information. The information stored in the cache subsystem is accessed by accessing each of these tiers in turn.

Figure 3:
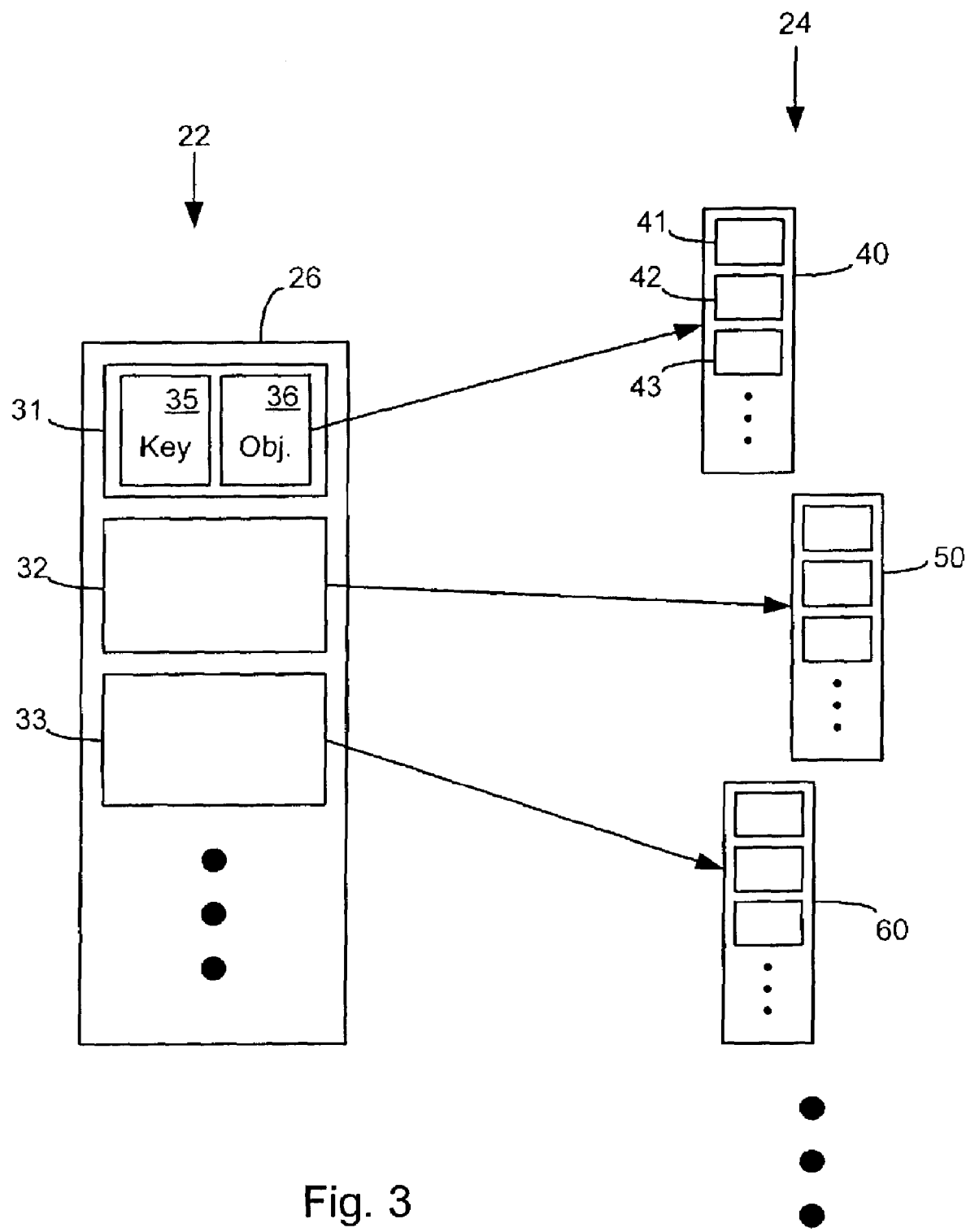
FIG. 3 is a diagram illustrating a multi-tiered cache structure in accordance with one embodiment of the invention.

Referring to FIG. 3, a diagram illustrating a multi-tiered cache structure in accordance with one embodiment of the invention is shown. As depicted in this figure, cache subsystem 18 comprises a first tier 22 and a second tier 24. The first tier 22 actually comprises a single cache 30 having multiple entries (e.g., 31–33). Second tier 24 comprises a plurality of caches (e.g., 40, 50, 60).

Each entry in each of the caches includes a key and an object. The key is used to identify a desired entry into cache. The object is the desired information that is stored in the cache. Because cache subsystem 18 is designed to store Web content, the keys for entries (e.g. 35) in first tier cache 26 comprise URLs (uniform resource locators). The objects (e.g. 36) for the entries comprise references to caches in the second tier 24. For example, object 36 of first-tier cache entry 31 is a reference to second-tier cache 40.

Cache 40 (as well as other second-tier caches) is very similar, in that each entry (e.g., 41, 42, 43) includes a key and an object. Because cache 40 is in the lowest tier of the cache structure, however, the objects contained in its cache entries comprise objects of the type that cache subsystem 18 is designed to store (e.g., Web pages). If cache subsystem 18 had more than two tiers, the objects contained in caches (e.g., 40) in the second tier 24 would comprise references to caches in a third tier. This third tier could be the lowest tier, or it could be yet another intermediate tier in which cached objects comprise references to caches in subsequent tiers. Thus, the structure is expandable to any number, N, of tiers.

Figure 4:
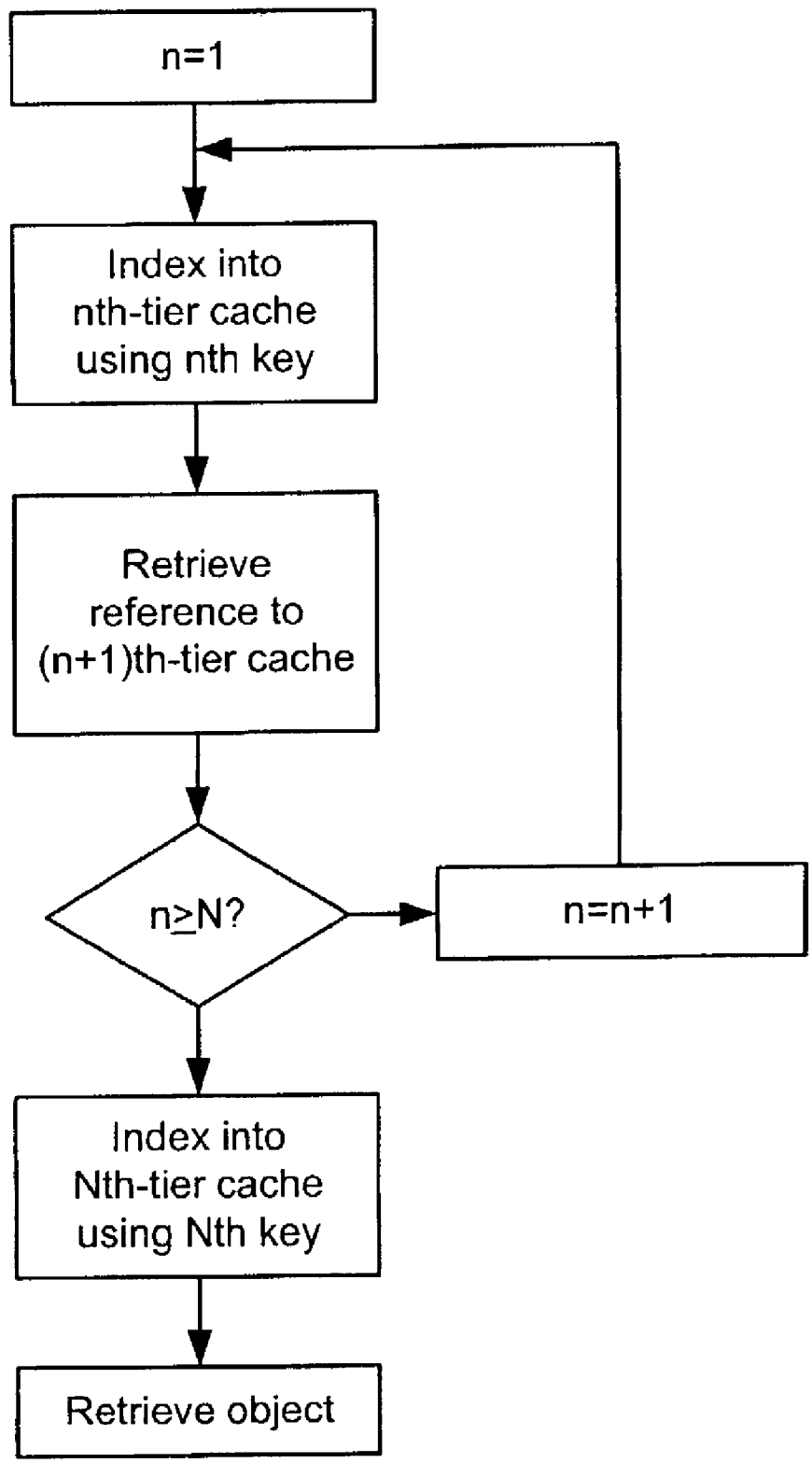
FIG. 4 is a flow diagram illustrating a general method applicable to an N-tier cache structure.

The method employed in the use of this cache structure to retrieve stored objects is summarized in the flow diagram of FIG. 4. The flow diagram of FIG. 4 represents the generalized method applicable to an N-tier cache structure. As shown in this figure, a first key is used to index into a first structure to retrieve a reference to a second-tier cache. This may be repeated, depending upon the number of tiers, N, in the cache structure. For the last (Nth) tier, the cache is indexed using the Nth key to retrieve the stored object.

In the context of the preferred embodiment, in which the cache subsystem is implemented in a network transformation proxy, keys in the first-tier cache 26 comprise the names (e.g., URLs) of the respective content stored therein. Objects in the first-tier cache 26 comprise references to caches in second-tier 24. Keys in the second-tier caches are based on parameters that specify a different version of the content identified by the URLs. Objects in the second-tier caches comprise the Web content stored by cache subsystem 18. In combination, they keys of the first- and second-tier caches can be used to store or retrieve any version of any piece of content stored in cache subsystem 18.

In a simple embodiment of the current invention, two different caches, or as many caches as are needed, each use a key to store a value. The functionality of each cache is similar. The caches may comprise any caching or associative memory structure.

One embodiment of the current invention is a multi-tiered caching system. In a simple embodiment, the current invention uses a two-tiered caching system. In the first tier, a key based on content name is used to identify one of many secondary caches. Within the secondary cache, a particular version of the content specified in the first tier key is identified with a key that encapsulates the information specifying its version. Programmatically, this can be thought of as:

Level_1_Cache:=CacheOf<
    f(Content_Name),
    Level_2_Cache
>

Level_2_Cache:=CacheOf<
    g(Description_Of_Content_Version),
    Content_Version
>

The abstract functions f( ) and g( ) convert their arguments into a compact and easily matchable key. In the preferred embodiment, an MD5 sum is used, but any (approximately) unique encoding could be used. CacheOf<Key, Content> is a caching data structure that stores and retrieves content via association with key.

The first tier cache (Level_1_Cache) is a cache of caches, in which a key based on the content-name is used to store and retrieve a second tier cache (Level_2_Cache). The second tier cache is a standard cache that associates the description of the content version with the appropriate content version. Significantly, the second tier cache key does not need to encapsulate the content-name, as all items in each second tier cache are different versions of the same content—specifically, the content identified by Content_Name.

The second tier cache, which stores a key consisting of a version and a value consisting of a Web page, is similar to existing art in this field. However, the first tier cache, which stores a key consisting of a URL and a value consisting of a secondary cache, is unique in that is stores caches.

In a preferred embodiment, the first tier cache (Level_1_Cache) is based on the name (e.g., URL) of the content, and it points to a second tier cache. The second tier cache (corresponding to Level_2_Cache) is based on the type and parameter settings of the transformations that have been applied to the content.

In the preferred embodiment, the first tier cache (corresponding to Level_1_Cache described in the simple embodiment above) is keyed using an MD5Sum of the content URL. The MD5 algorithm, developed by Professor Ronald L. Rivest of MIT, is a commonly used one-way function, with the property that it is extraordinarily unlikely that two non-equal inputs will yield the same result. This algorithm makes keys that identify data more efficient.

The second tier cache contains multiple versions of the content identified by the URL. The proxy may create these multiple versions by performing parameterized transformations on the Web content. The second tier cache is keyed based on an MD5Sum of the transformation name and its parameters. Each key identifies the version of the content transformed using those settings.

The preferred embodiment uses C++ templates to construct caches within the multi-tier cache structure. A C++ template makes it unnecessary to write separate bodies of code to accomplish similar tasks. It makes the tasks abstract, allowing one C++ object to perform multiple tasks. To accomplish a specific task, keys and values of any type can be assigned to the template. In the case of the present system, a C++ template makes it unnecessary to write two separate bodies of code for the first and second tier caches. The key and value types for the two different caches can both fit within the structure of the same C++ template. Exemplary systems and methods for using C++ templates in this manner are described in detail in U.S. patent application Ser. No. 10/345.593, by inventors Jeremy S. de Bonet, Todd A. Stiers, Jeffrey R. Annison, Phillip Alvelda VII and Paul M. Scanlan, filed on Jan. 16, 2003 and entitled "A Design for Storage and Retrieval of Arbitrary Content and Application Data."

Using multi-tiered caching makes cache lookups more efficient. For example, a caching proxy may store 10 separate versions each of 1,000 URLs. Using the current invention, the URLs would not need to be stored as 10,000 separate entities using 10,000 separate keys. Instead, the URLs could be stored as only 1,000 separate entities using 1,000 separate keys. When performing a lookup for a specific version of a specific page, the proxy would need to search only 1,000 URLs, then 10 versions of that URL. This lookup would require a search of only 1,010 separate entities instead of 10,000.

Using multi-tiered caching makes cache lookups more efficient. For example, a caching proxy may store 10 separate versions each of 1,000 URLs. Using the current invention, the URLs would not need to be stored as 10,000 separate entities using 10,000 separate keys. Instead, the URLs could be stored as only 1,000 separate entities using 1,000 separate keys. When performing a lookup for a specific version of a specific page, the proxy would need to search only 1,000 URLs, then 10 versions of that URL. This lookup would require a search of only 1,010 separate entities instead of 10,000

Further, the current invention yields a way to store data that may be common to all the content. For example, the date the content was created or various other HTTP headers may be common across all versions (as in the case of a transforming proxy), and the current invention offers a common place to store this information. The information does not need to be stored independently for each version of the content, and if any changes occur, they can be made to multiple versions of the content at the same time.

Also, since all versions of a Web page are stored together in a single cache, a developer can manipulate, dump, or delete them together, without needing to identify each one individually.

Developers can extend this cache beyond two tiers. Additional keys that could be used to index into the caches of these tiers could include other identifiers, such as device type, browser, or payment level.

As the diversity between network clients grows, so does the need for creating multiple versions of content, each optimized for a different type of client. Before this invention, no method existed to organize this multi-versioned content into a single, unified caching structure.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms 'comprises,' 'comprising,' or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A multi-tiered caching system, comprising:
   a plurality of caches for storing and retrieving objects of a first type between a Web server and one or more clients,
      wherein each entry in each of the cache comprises an object and a key associated with the object,
      wherein the plurality of caches includes an nth-level cache and a plurality of (n+1)th-level caches, wherein n is angy integer number, n≧1,
      wherein each object in each entry in the (n+1)th-Ievel cache comprises an object of the first type,
      wherein each (n+1)th-level cache is configured to store multiple versions of a Web page corresponding to a single URL, and
      wherein each object in each entry in the nth-level cache comprises an identifier of a corresponding (n+1)th-level cache; and
   a web page caching system implemented in a network transformation proxy;
      wherein the nth-level cache comprises a first-level cache,
      wherein keys associated with objects in the first-level cache comprise URLs, and
      wherein objects in the first-level cache comprise identifiers of second level caches;
      wherein the (n+1)th-level cache comprises a second-level cache,
      wherein keys associated with objects in the second-level cache comprise versions of corresponding URLs, and
      wherein objects in the second-level cache comprise Web pages.

2. The system of claim 1, wherein the network transformation proxy is configured to perform one or more transformations on the Web pages and store the transformed Web pages in the (n+1)th-level caches.

3. The system of claim 1, wherein the objects comprise Web content.

4. The system of claim 3, wherein at least a portion of the Web content comprises Web pages.

5. The system of claim 1, wherein the keys in the nth-level cache comprise URLs.

6. The system of claim 1, wherein the keys in the (n+1)th-level cache comprise version identifiers.

7. The system of claim 1, wherein the multi-tiered caching system comprises at least one additional level of caches and wherein cache objects in each level except a lowest level refer to caches in a lower level.

8. The system of claim 1, wherein the (n+1)th-level caches are configured to store shared information that is common to all of the entries in the corresponding cache.

9. The system of claim 1, wherein the multi-tiered caching system is configured to enable manipulation of all of the entries in a selected (n+1)th-level cache via a combined operation.

10. A method for retrieving a desired object, wherein a plurality of keys are associated with the desired object, the method comprising:
   identifying a plurality of keys associated with the desired object;

looking up an nth entry in an nth-level cache by an nth one of the identified keys,
    wherein n is any integer number, n≧1,
    wherein the nth entry contains the nth one of the identified keys and an nth object,
    wherein the nth object comprises an identifier of a (n+1)th-level cache,
    wherein the nth-level cache and the (n+1)th-level cache are part of a multi-tier caching system for storing and retrieving objects between a Web server and one or more clients,
    wherein the (n+1)th-level cache is configured to store multiple versions of a Web page corresponding to a single URL;
looking up an (n+1)th entry in the (n+1)th-level cache,
    wherein the (n+1)th entry contains an (n+1)th one of the identified keys and an (n+1)th object,
    wherein the (n+1)th object comprises the desired object,
    wherein the desired object is a Web page;
    wherein identifying the plurality of keys associated with the desired object comprises a URL for the Web page and a version of the URL; and
looking up a first entry in a first-level cache by the URL,
    wherein the first entry contains the URL as the corresponding key and an identifier of a second-level cache as the corresponding object; and looking up a second entry in the second-level cache,
    wherein the second entry contains the version of the URL as the corresponding key and the desired Web page as the corresponding object.

11. The method of claim 10, wherein the desired object comprises Web content.

12. The method of claim 11, wherein the Web content comprises a Web page.

13. The method of claim 10, wherein the nth key comprises a URL.

14. The method of claim 10, wherein the (n+1)th key comprises a version identifier.

15. The method of claim 10, wherein the caches comprise a cache system having more than two tiers.

16. The method of claim 10, wherein the (n+1)th-level cache is configured to store shared information that is common to all of the entries in the (n+1)th-level cache.

17. The method of claim 10, further comprising manipulating all of the entries in the (n+1)th-level cache via a combined operation.

18. The method of claim 10, further comprising performing one or more transformations on the Web content and storing the transformed Web content in the (n+1)th-level cache.

19. A software product comprising a plurality of instructions embodied in a medium readable by a data processor, wherein the instructions are configured to cause the data processor to perform:

identifying a plurality of keys associated with a desired object;
looking up an nth entry in an nth-level cache by an nth one of the identified keys,
    wherein n is any integer number, n≧1,
    wherein the nth entry contains the nth one of the identified keys and an nth object,
    wherein the nth object comprises an identifier of a (n+1)th-level cache,
    wherein the nth-level cache and the (n+1)th-level cache are part of a multi-tier caching system for storing and retrieving objects between a Web server and one or more clients,
    wherein the (n+1)th-level cache is configured to store multiple versions of a Web page corresponding to a single URL;
looking up an (n+1)th entry in the (n+1)th-level cache,
    wherein the (n+1)th entry contains an (n+1)th one of the identified keys and an (n+1)th object,
    wherein the (n+1)th object comprises the desired object,
    wherein the desired object is a Web page;
    wherein identifying the plurality of keys associated with the desired object comprises a URL for the Web page and a version of the URL;
looking up a first entry in a first-level cache by the URL,
    wherein the first entry contains the URL as the corresponding key and an identifier of a second-level cache as the corresponding object; and
looking up a second entry in the second-level cache,
    wherein the second entry contains the version of the URL as the corresponding key and the desired Web page as the corresponding object.

20. The software product of claim 19, wherein the desired object comprises Web content.

21. The software product of claim 20, wherein the Web content comprises a Web page.

22. The software product of claim 19, wherein the nth key comprises a URL.

23. The software product of claim 19, wherein the (n+1)th key comprises a version identifier.

24. The software product of claim 19, wherein the caches comprise a cache system having more than two tiers.

25. The software product of claim 19, wherein the (n+1)th-level cache is configured to store shared information that is common to all of the entries in the (n+1)th-level cache.

26. The software product of claim 19, further comprising manipulating all of the entries in the (n+1)th-level cache via a combined operation.

27. The software product of claim 19, further comprising performing one or more transformations on the Web content and storing the transformed Web content in the (n+1)th-level cache.

* * * * *